Patented May 15, 1923.

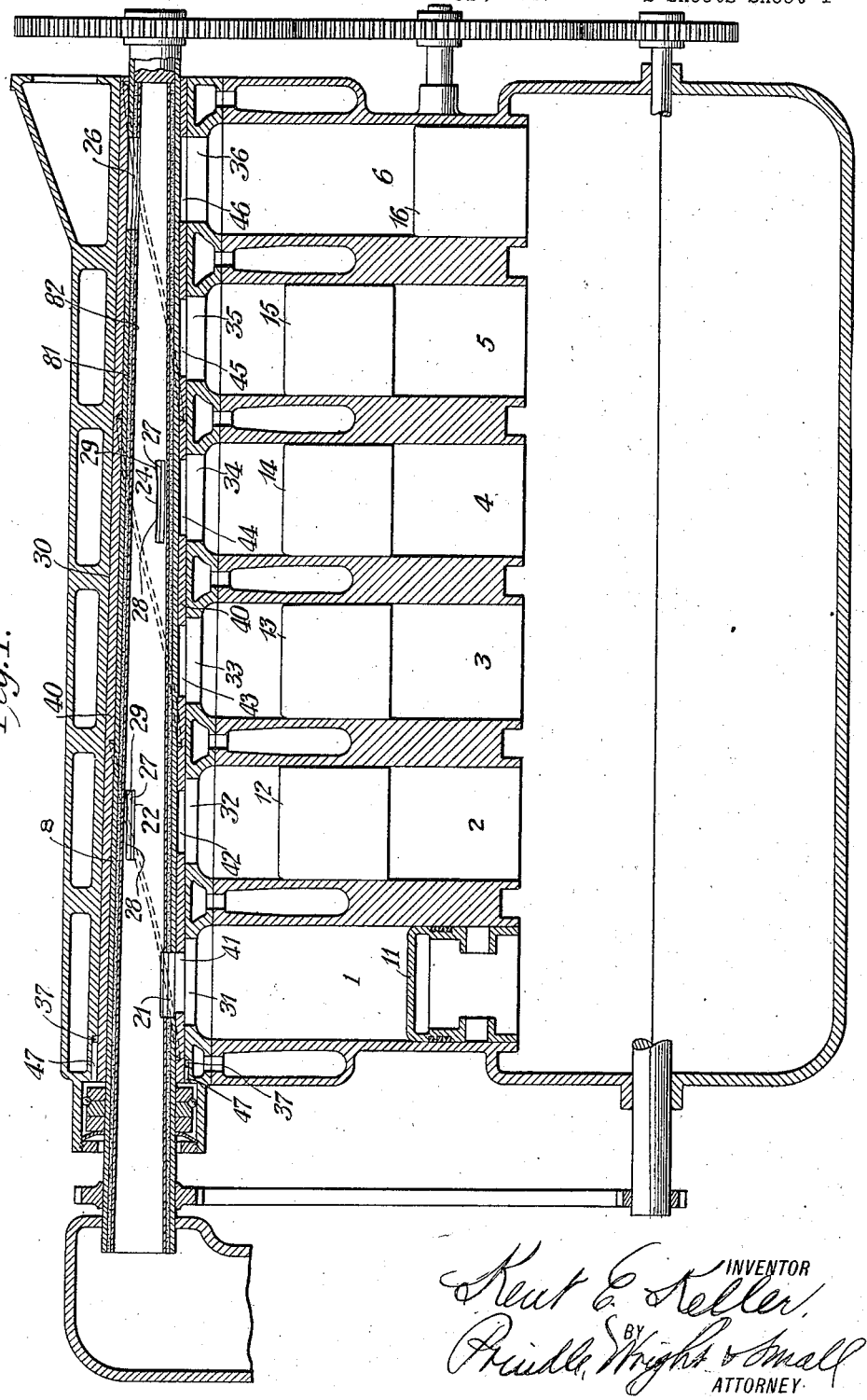

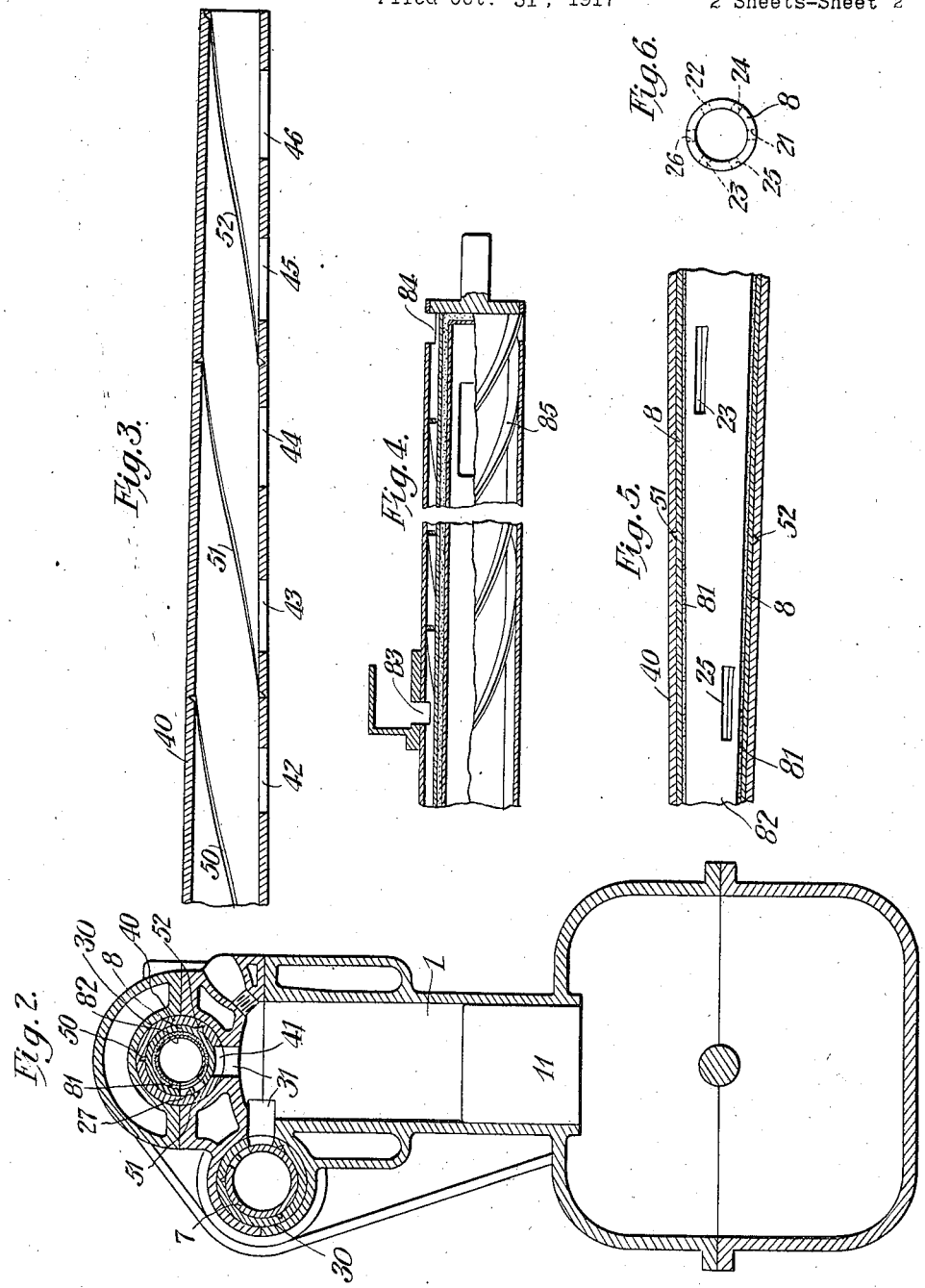

1,455,055

UNITED STATES PATENT OFFICE.

KENT E. KELLER, OF AVA, ILLINOIS.

VALVE FOR EXPLOSIVE ENGINES.

Application filed October 31, 1917. Serial No. 199,431.

*To all whom it may concern:*

Be it known that I, KENT E. KELLER, of Ava, in the county of Jackson and in the State of Illinois, have invented a certain new and useful Improvement in Valves for Explosive Engines, and do hereby declare that the following is a full, clear, and exact description thereof.

My invention relates to explosive engine valves and has for its object to provide an efficient and economical valve mechanism preferably of the conical rotary type.

A further object of my invention is to provide in a valve controlling a plurality of cylinders, a plurality of ports the angular width (number of degrees of arc of circle) and the area of which shall be equal, irrespective of the diameter of the part of the conical valve in which each valve port is placed.

A further object of my invention is to shape the valve ports so as to reduce materially the explosive noises.

A further object of my invention is to strengthen the valve across the ports.

A further object of my invention is to provide means by which worn parts may be replaced economically, quickly, and accurately.

A further object of my invention is to provide means so that the operation of the valve will remove foreign substances from the valve bore, will facilitate oiling, and will provide a graphite lubricant.

Other and further objects of my invention will be apparent from the following description of one embodiment of my invention, in which—

Figure 1 is a longitudinal section through approximately the center of the engine;

Figure 2 a section at right angles to Figure 1 through the center of a cylinder;

Figure 3 an enlarged longitudinal section of a portion of the bore sleeve;

Figure 4 a section partly in elevation of a valve provided with water-cooling attachment;

Figure 5 is an enlarged longitudinal section of a portion of the bore, bore sleeve, and valve, but showing the opposite side from that shown in Figure 1; and Figure 6 an end view of the valve showing the ports in dotted lines.

Similar reference characters refer to similar parts throughout the drawings.

Referring to the embodiment of the invention illustrated in the drawings, an explosive engine is represented having six cylinders, 1, 2, 3, 4, 5, and 6, with pistons 11, 12, 13, 14, 15, and 16, respectively. The intake is controlled by a rotary conical valve 7 (Figure 2) and the exhaust by a rotary conical valve 8. Each valve is provided with ports, one for each cylinder, numbered 21, 22, 23, 24, 25, and 26 respectively.

The sequence of cylinder operation may be as desired, the embodiment chosen for purposes of illustration providing for cylinder operation in the following order, 1, 4, 2, 6, 3, 5.

The angular width (number of degrees of arc of circle) of each port in the valve is the same, but the length of each port varies from the greatest length in the port at the smallest diameter of the valve, to the shortest length in the port at the greatest diameter of the valve, so that preferably the area of each port in a valve is the same. By having the angular width (number of degrees of arc of circle) the same in each port, the time during which each port is open will be the same, thus facilitating uniformity of operation.

Each valve fits within a correspondingly tapering bore 30, having ports 31, 32, 33, 34, 35, and 36. If desired, a sleeve 40 having ports 41, 42, 43, 44, 45, and 46 may be fitted within the bore to provide a wearing surface which may be renewed as occasion demands. In order that the sleeve may be placed in the bore only in such position that its ports shall correspond with the proper cylinder ports, slots 37 of varying size may be provided on the bore, in which correspondingly sized lugs or projections 47 on the sleeve are adapted to fit.

The ports in the valve preferably are slightly longer toward the larger diameter of the valve than their corresponding ports in the sleeve (or in the bore if a sleeve is not utilized) so that as the valve wears and thus moves toward the smaller end of the bore, the port opening will not be obstructed but always will maintain a predetermined opening. The same result may be obtained by making the port in the sleeve or bore, as the case may be, slightly longer toward the smaller end of the bore. If desired, each valve port may be provided with a web 27 to strengthen the valve at that point.

In order to eliminate explosive noises, the approaching bottom edge of each port in the exhaust valve may be formed so that from the vertical edge of the valve near the larger end of the bore the bottom or approaching edge of the port runs straight as at 28 for approximately half the distance and then curves upwardly as at 29 with a slight outward curve. Thus, the first opening to the cylinder port will be slight, the opening gradually increasing until a proper portion of the length of the opening has been uncovered, when the full opening becomes available for exhaust discharge.

Opposite each port in the exhaust valve an extra metal lining may be sprung to protect the valve from the hot gases. This lining may form part of a protective inner lining of asbestos, mineral wool, or other non-conductor 81 held in place by an inner metal sheet 82. The walls of the valve likewise may be hollow for the introduction of water which will be forced from an entrance 83 to an exit 84 by spiral blades 85 therein (Figure 4).

On each sleeve is provided a series of spiral grooves turned or twisted about one and a half turns to the valve and spaced substantially equally apart. One groove 50 is cut with a 90° angle against the direction of rotation of the valve and with a gradual slope in the other direction, so that the rotation of the valve will tend to carry foreign substances out of the sleeve on the rear thereof. The second spiral groove 51 is cut with its 90° angle with the direction of rotation of the valve and with a gradual slope in the opposite direction so that the rotation of the valve will tend to carry oil throughout the bore. The third groove 52 is adapted to be filled with graphite or any desired solid lubricant. The grooves are so arranged as not to extend along any portion of the valve where they will be hit by the exhaust gases coming from the cylinder.

Many modifications will be apparent to those skilled in the art, my invention not being limited to the specific embodiment chosen for purposes of illustration.

I claim—

1. In an explosive engine, a series of cylinders, pistons therein, an inlet port for each cylinder, an exhaust port for each cylinder, and means to control the opening from said exhaust ports comprising a conical exhaust valve having ports of the same angular width and area for each cylinder.

2. In an explosive engine, a series of cylinders, pistons therein, an inlet port for each cylinder, an exhaust port for each cylinder, and means to control the opening from said exhaust ports comprising a conical exhaust valve having ports varying in length but of the same area.

3. In an explosive engine, a series of cylinders, pistons therein, an inlet port for each cylinder, an exhaust port for each cylinder, and means to control the opening from said exhaust ports comprising a rotary exhaust valve, a bore, and a sleeve adapted to fit within said bore having a spiral groove cut with a 90° angle against the direction of rotation of the valve and with a gradual slope in the other direction.

4. In an explosive engine, a series of cylinders, pistons therein, an inlet port for each cylinder, an exhaust port for each cylinder, and means to control the opening from said exhaust ports comprising a rotary exhaust valve, a bore, and a sleeve adapted to fit within said bore having a spiral groove cut with a 90° angle with the direction of rotation of the valve and with a gradual slope in the other direction.

5. In an explosive engine, a series of cylinders, pistons therein, an inlet port for each cylinder, an exhaust port for each cylinder, and means to control the opening into said inlet ports comprising a conical inlet valve having ports of the same angular width and area for each cylinder.

6. In an explosive engine, a series of cylinders, pistons therein, an inlet port for each cylinder, an exhaust port for each cylinder, and means to control the opening into said inlet ports comprising a conical inlet valve having ports varying in length but of the same area.

7. In an explosive engine, a series of cylinders, pistons therein, an inlet port for each cylinder, an exhaust port for each cylinder, and means to control the opening into said inlet ports comprising a rotary inlet valve, a bore, and a sleeve adapted to fit within said bore having a spiral groove cut with a 90° angle against the direction of rotation of the valve and with a gradual slope in the other direction.

8. In an explosive engine, a series of cylinders, pistons therein, an inlet port for each cylinder, an exhaust port for each cylinder, and means to control the opening into said inlet ports comprising a rotary inlet valve, a bore, and a sleeve adapted to fit within said bore having a spiral groove cut with a 90° angle with the direction of rotation of the valve and with a gradual slope in the other direction.

In testimony that I claim the foregoing I have hereunto set my hand.

KENT E. KELLER.

Witnesses:
E. A. BROWN,
R. WALWARK, Jr.